March 16, 1954 R. E. CRAGG 2,672,507

ERROR DETECTOR FOR DECIPHERING APPARATUS

Filed July 10, 1951 2 Sheets-Sheet 1

INVENTOR
RICHARD E. CRAGG
BY Emery Robinson
ATTORNEY

March 16, 1954 R. E. CRAGG 2,672,507

ERROR DETECTOR FOR DECIPHERING APPARATUS

Filed July 10, 1951 2 Sheets-Sheet 2

INVENTOR
RICHARD E. CRAGG

BY Emery Robinson
ATTORNEY

Patented Mar. 16, 1954 2,672,507

UNITED STATES PATENT OFFICE 2,672,507

ERROR DETECTOR FOR DECIPHERING APPARATUS

Richard E. Cragg, Wilmette, Ill., assignor to Teletype Corporation, Chicago, Ill., a corporation of Delaware Application July 10, 1951, Serial No. 236,024

10 Claims. (Cl. 178—22)

This invention relates to an error detector for deciphering apparatus and more particularly to an error detecting device for ascertaining the propriety of a sequence of ciphered code combinations.

In accordance with the present invention, messages to be deciphered are produced as permutations in message tape. Messages are originally produced as electrical impulses in the well known Baudot code and then are enciphered by superimposing the effect of additional ciphering impulses upon these coded impulses in order to ultimately change the permutations produced by these coded impulses in the message tape. The end result of the enciphering operation is to produce a ciphered code in the message tape in the terms of the Baudot code so that the ciphered code combination represents characters other than the characters which were originally represented. In practice it has been found necessary that the ciphered code characters be divided into groups and that each group contain an equal number of characters. In order to insure the proper functioning of the deciphering apparatus these code groups are each separated by a control code character. Thus the addition or omission of a ciphered code combination to one of these groups through the fault of the operator or by a transmission error would result in the deciphering apparatus functioning to gain or lose an operation and thus operate out of phase with the code combinations contained in the ciphered message tape. Consequently, if the deciphering operation is not stopped and a correction made upon the occurrence of such an error, the remainder of the deciphering operation will result in the reception of a mutilated message.

A system utilizing groups of cipher code combinations separated by control code combinations is disclosed in the patent to G. A. Locke No. 2,406,021, issued August 20, 1946. In this patent, there is disclosed a complete system for generating ciphered code combinations, inserting control code combinations after each group of ciphered code combinations, means for transmitting and receiving the enciphered signals, means for deciphering the enciphered code combinations and finally means for discarding the control combinations.

It is an object of this invention to provide an error detector for ascertaining the propriety of a sequence of ciphered code combinations in a message tape.

It is a further object of this invention to provide means for indicating an error in the reception of ciphered code combinations in a deciphering apparatus.

An additional object of this invention is to provide means for interrupting the operation of the deciphering apparatus upon the occurrence of an error in the sequence of ciphered code combinations being deciphered by the deciphering apparatus.

A still further object of this invention is the provision of a simple mechanism operable in synchronism with the sensing of ciphered code combinations for indicating an excess of ciphered code combinations within a group of ciphered code combinations.

With these and other objects in view the present invention contemplates the use of a ratchet which is stepped in unison with the advance of a perforated tape containing ciphered code combinations therein through a deciphering apparatus. A helical spring is connected to and wound up by the ratchet so that the ratchet is urged toward its initial position after each advance. A detent is provided to engage and retain the ratchet in position after each advancement thereof. A pair of control cams are also connected to and advanced by the ratchet. If the ratchet is advanced a number of increments equal to the number of code combinations within a particular group and a control code combination is sensed in the message tape following such group, a cam follower is moved by one of the cams to operate a control circuit to withdraw the detent to cause the ratchet to return to its initial position. In situations, wherein the ciphered code group consists of more or less than the predetermined number of code combinations and a control code combination is not sensed at the proper time, then the ratchet is again advanced to move a follower operated by the other of said cams to complete a second control circuit. The operation of this second control circuit results in, first, the illumination of an indicator lamp, and secondly, the interruption of the operating circuit for the deciphering apparatus.

Other objects and advantages of the present invention will be apparent from the following detailed description when considered in conjunction with the accompanying drawings, wherein.

Figure 1:
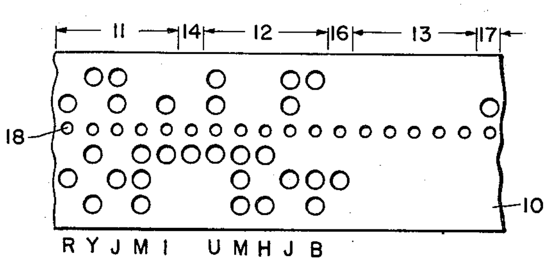
Fig. 1 illustrates a typical permutated tape for use in operation of a deciphering apparatus.

Referring now to Fig. 1, there is shown a message tape 10 having ciphered message therein. The ciphered code permutations 11, 12, and 13 are arranged in groups wherein each group consists of five ciphered code permutations. It is to be understood that the present invention may be modified to accommodate groups containing more or less than five ciphered code permutations within any group. Each of the groups 11, 12, and 13 are separated by a control code permutation 14, 16, and 17. In accordance with the Baudot code the control code permutation 14 is illustrated as being indicative of a space function. The control code permutations 16 and 17 are illustrated as being indicative of a carriage return function and a line feed function respectively.

Figure 2:
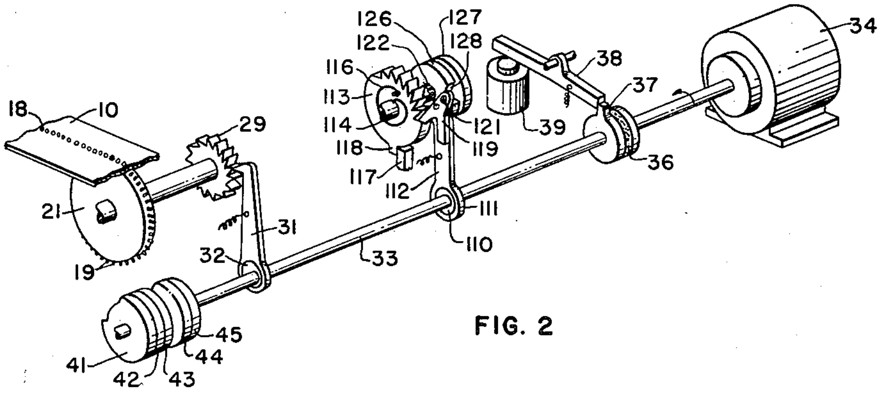
Fig. 2 is a schematic perspective view of a tape feed device and a portion of an error detecting device for use in the deciphering apparatus.
Figure 3:
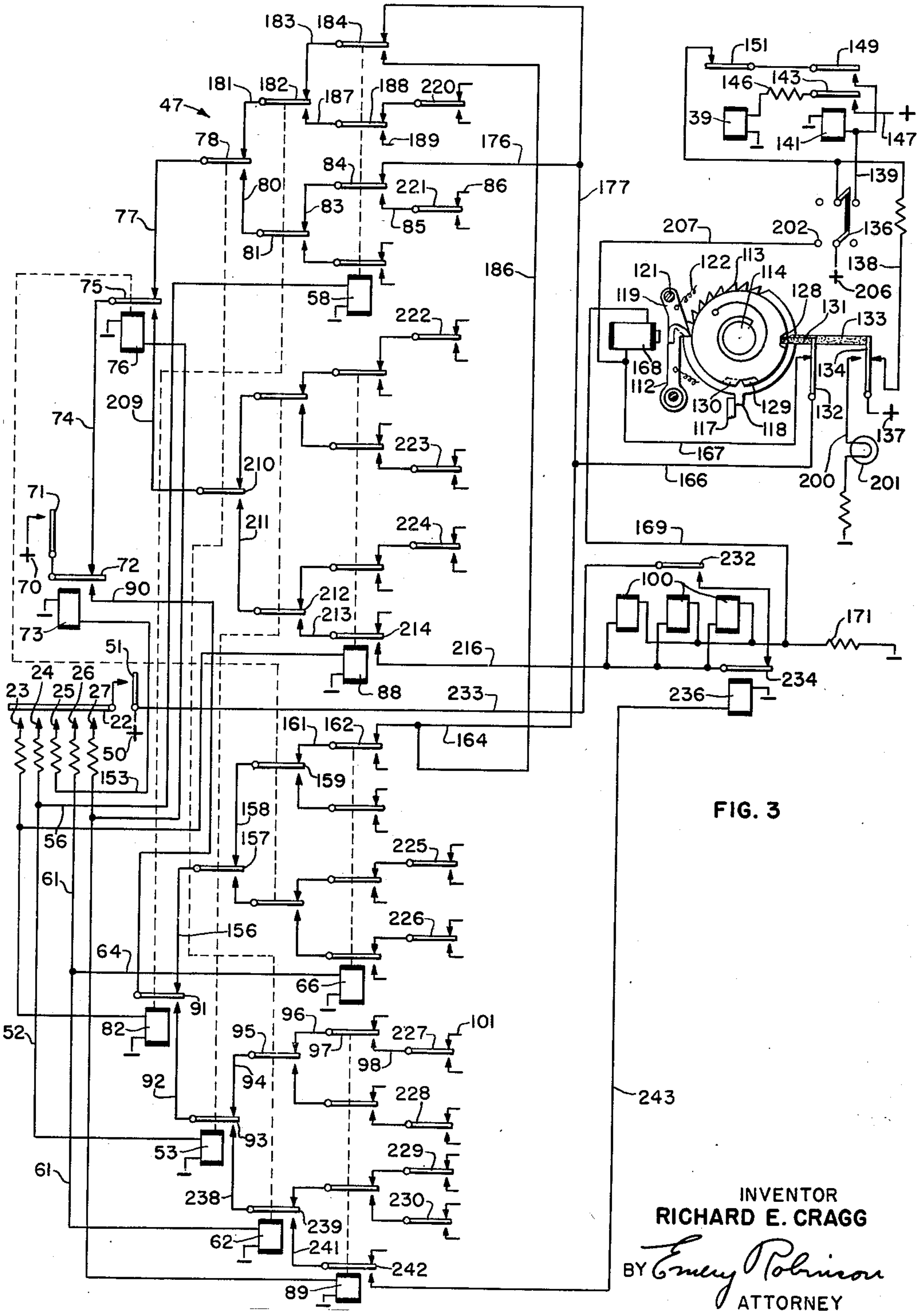
Fig. 3 is a circuit diagram including an error detecting mechanism embodying the principal features of the present invention.

Attention is now directed to Figs. 2 and 3. The tape 10 with feed holes 18 therein is engaged by pins 19 of a feed wheel 21 and as the feed wheel 21 is advanced, the tape 10 is fed between a fixed contact 22 and five sensing contacts 23 to 27, inclusive. The feed wheel 21 is connected to and stepped forward by means of a ratchet 29. A pawl 31 cyclically operated by a cam 32 mounted on a power shaft 33, engages and advances the ratchet in steps of one increment. A motor 34 drives the shaft 33 through a start clutch 36. This start clutch may be of the friction type and has a dog 37 projecting from the driven element which is normally engaged by a spring biased stop pawl 38. The position of the stop pawl 38 is controlled through the instrumentality of a start magnet 39.

There is also secured to the shaft 33 a plurality of sensing pin cams 41 to 45, inclusive, for moving the sensing contacts 23 to 27, inclusive, into position to sense the permutations contained in the message tape 10. The contours of the cams 32 and 41 to 45, inclusive, are such as to permit the sensing operation to occur prior to each advance of the feed wheel 21.

The sensing contacts 23 to 27, inclusive, are each connected to operate relay circuits contained in a converter fan circuit designated generally by the reference numeral 47 in Fig. 3. In operation of this converter circuit a first ciphered code permutation in the tape 10 which, according to the Baudot code, is an R character; that is, the second and fourth permutations are perforations in the tape. In such a situation a circuit may be traced from positive battery 50, through a cyclically operable contact 51, through the fixed contact 22, the sensing contact 24, over a lead 52, through a relay 53 to negative battery. The contact 51 is cyclically closed by means operative off of the main shaft 33 (not shown) and such operation occurs substantially simultaneously with the movement of the sensing contacts into engagement with the message tape 10. A circuit may be also traced from positive battery 50 through the cyclically closed contact 51, the fixed contact 22, the sensing contact 24, over the lead 52, over a lead 56, through a relay 58 to negative battery. An additional circuit may be also traced from positive battery 50, through the cyclically operable contact 51, the fixed contact 22, the sensing contact 26, over lead 61, through a relay 62 to negative battery. A further circuit is also completed from positive battery 50 through the cyclically operable contact 51, the fixed contact 22, the sensing contact 26, over the lead 61, over a lead 64, through a relay 66 to negative battery. Energization of the relays 53, 58, 62, and 66 results in the drawing up of the armatures associated with each of these relays. The armatures operated by these relays are shown as being connected by dotted lines to the respective relays. Energization of these relays results in a completion of a circuit which may be traced from positive battery 70, through a cyclically operable contact 71, operated by a cam (not shown) on the main shaft 33, through an armature 72 of a de-energized relay 73, over a lead 74, through an armature 75 of a deenergized relay 76, over a lead 77, through a drawn up armature 78 of the energized relay 62, over lead 80 ,through an armature 81 of a de-energized relay 82, over a lead 83, through a drawn up armature 84 of the energized relay 58, over a lead 85, through an armature 221 of a de-energized figures bank of relays 100, to a lead 86.

The lead 86 may be connected to a printer magnet or to a circuit contained in a deciphering apparatus. The connection of the lead 86 to such other apparatus is not of paramount importance in order to understand the present invention and hence is not further illustrated or described. The circuit heretofore described is primarily provided for the purpose of converting the ciphered permutations contained in the message tape 10 into a single energized circuit for controlling the operation of a deciphering or printing apparatus.

Considering now the second permutated code combination in the tape 10, wherein the first, third, and fifth permutations are illustrated as being perforations and which is understood to represent the letter Y in accordance with the Baudot code, the sensing of these permutations in the message tape results in the application of positive battery 50, through the contacts 23, 25, and 27 to relays 82 and 88, 73, 89 and 76, respecitvely, whereby these relays are energized over the circuits similar to the energizing circuits hereinbefore described in regard to relays 53, 58, 62 and 66 and hence for a purpose of simplification of this description these energizing circuits will not be specifically traced. Again as previously described, the armatures connected by dotted lines to these relays are drawn up upon the energization of the respective relays. Hence upon energization of the relays 73, 82 and 89, a circuit may be traced from positive battery 70, through the cyclincally operated contact 71, through the cyclically operated contact 71, through the drawn up armature 72 of the energized relay 73, over a lead 90, through a drawn armature 91 of the energized relay 82, over a lead 92, through an armature 93 of the de-energized relay 53, over a lead 94, through an armature 95 of the de-energized relay 62, over a lead 96, through a drawn up armature 97 of the energized relay 89, over a lead 98, through an armature 227 of the de-energized figure relays 100, to the leads 101. The lead 101 is again connected through suitable circuits to the deciphering or printing apparatus as previously indicated.

Referring again to Fig. 2, it may be noted that prior to the completion of each cycle of operation of the feed pawl 31 by the cam 32, a second cam 110 secured to the shaft 33 is moved to advance a follower yoke 111 formed integral with a feed pawl 112. The feed pawl 112 is advanced over the teeth of a ratchet 113 and upon further movement of the shaft 33 the pawl 112 is moved downwardly to engage one of the teeth of the ratchet 113 so as to advance this ratchet one increment. The timing of the actuation of the feed pawl 112 is such as to occur prior to the operation of the feed pawl 31 and also subsequent to the movement of the sensing contacts 23 to 27, inclusive, into sensing position by the sensing cams 41 to 45, inclusive. Thus it may be appreciated that upon completion of each sensing operation by the sensing contacts 23 to 27, inclusive, the pawl 112 is advanced to engage and move the ratchet 113 forward one increment.

The ratchet 113 is mounted for rotation on a fixed shaft 114, as shown in Figs. 2 and 3. A helical spring 116 is secured at one end to the shaft 114 and at its other end to the ratchet 113, thus providing a means for urging the ratchet toward an initial position. The initial position of the ratchet is determined by a fixed stop 117 which engages a dog 118 formed integral with the ratchet 113. Therefore, as the ratchet 113 is advanced by the stepping pawl 112 the helical spring 116 winds up and if no retaining means are provided for the ratchet, the ratchet returns to its initial position after each advance of the ratchet 113 by the stepping pawl 112. In order to maintain the ratchet in its advanced position, a detent 119 is provided and is pivotally mounted at 121 and urged by a spring 122 into engagement with the teeth of the ratchet 113. A pair of cams 126 and 127 are secured to and advanced by the ratchet 113. The cam 126 is provided with recesses 128 and 129 and the cam 127 is provided with a recess 130 (see Fig. 3). A follower 131 having a pivotally mounted contact 132 follows the cam 126. A follower 133 secured to a pivotally mounted contact 134 is provided to follow the periphery of the cam 127.

Considering now the energization of the start magnet 39 (Figs. 2 and 3) which energization is necessary in order to initiate operation of the message tape feeding and sensing functions, in order to initiate operation of the apparatus a control switch 136 is thrown to its right-hand or start position whereby a circuit is completed from positive battery 137, through the pivoted contact 134, over a lead 138, through the switch 136, over a lead 139, through a start relay 141 to negative battery. Energization of the start relay 141 causes its armature 143 to be drawn up to complete a circuit for the start magnet 39 which may be traced from negative battery, through the magnet 39, over a lead 146, through the drawn up armature 143 and hence over a lead 147 to positive battery. Energization of the start relay 141 also results in the drawing up of its armature 149 to complete a locking circuit for the start relay 141. This circuit may be traced from positive battery 137, through the pivoted contact 134, over the lead 138, through an end of tape contact 151, through the armature 149 and hence through the start relay 141 to negative battery.

Energization of the start magnet 39 moves the stop pawl 38 out of engagement with the dog 37 of the start clutch 36. The shaft 33 is now continually rotated and the cam 32 cyclically advances the ratchet 29 to progressively feed the tape 10 over the sensing contacts 23 to 27, inclusive. The sensing cams 41 to 45, inclusive, cyclically move the sensing contacts 23 to 27, inclusive, into engagement with the tape in order to sense the perforations contained in the tape. Upon completion of each sensing operation the eccentric 110 advances the stepping pawl 112 over a tooth of the ratchet 113 and subsequently moves the pawl 112 downwardly to advance the ratchet one increment. The ratchet 113 continues to advance upon each sensing of a permutated code combination within a group. Upon the advance of the ratchet, five increments, the number of code combinations within one group, the contacts 23 to 27, inclusive, sense the first control permutation 14 in the tape 10 (see Fig. 1). The advance of the ratchet five increments moves the cam 126 into a position whereupon the follower 131 is positioned within the recess 129. As shown in Fig. 1, the control permutation is that of a space character, that is, the third permutation in the tape is a perforation. Upon the sensing of this perforation by the contact 25, the relay 73 is energized over a circuit from positive battery 50, through the cyclically operable contact 51, the fixed contact 22, the sensing contact 25, over a lead 153, through the relay 73 to negative battery. Energization of the relay 73 results in the drawing up of its armature 72 to complete a circuit from positive battery 70, through the cyclically operable contact 71, through the drawn up armature 72 of the energized relay 73, over the lead 89, through the armature 91 of the de-energized relay 82, over a lead 156, through an armature 157 of the de-energized relay 53, over a lead 158, through an armature 159 of the de-energized relay 76, over a lead 161, through an armature 162 of the de-energized relay 66, over a lead 164, over a lead 166, through the pivoted contact 132, now closed because the follower 131 is positioned within the recess 129, over a lead 167, through a withdrawal magnet 168, over a lead 169, over lead 171 to negative battery. Energization of the withdrawal magnet 168 withdraws the stepping pawl 112 and the holding detent 119 from engagement with the teeth of the ratchet 113, hence allowing the ratchet 131 to return to its initial position under the influence of the wound up helical spring 116. The withdrawal magnet is slow to release hence maintaining the pawl 112 and detent 119 out of engagement with the ratchet until the ratchet returns to its initial position.

The withdrawal magnet 168 may be energized by the sensing of other control functions in the message tape by the sensing contacts 23 to 27, inclusive, when follower 131 is positioned within the recess 129 formed in the cam 126. The control code permutation shown in Fig. 1 following the ciphered code group 12 is a perforation in the fourth permutation, which according to the Baudot code is a carriage return permutation. Upon the sensing contact 26 sensing a carriage return permutation in the tape, circuits may be traced from positive battery 50, through the cyclically operable contact 51, the fixed contact 22, through the sensing contact 26, over leads 61 and 64, through the relays 62 and 66, respectively, to negative battery. Energization of the relay 62 causes a circuit to be thereupon completed from positive battery 70, through the cyclically operable contact 71, through the armature 72 of the de-energized relay 73, over the lead 74, through the armature 75 of the de-energized relay 76, over the lead 77, through the drawn up armature 78 of the energized relay 62, over the lead 80, through the armature 81 of the de-energized relay 82, over the lead 83, through the armature 84 of the de-energized relay 58, over a lead 176, over a lead 177, over the lead 166, through the pivoted contact 132, now positioned within the recess 129, over the lead 167, through the withdrawal magnet 168, over the lead 169, over the lead 171 to negative battery. The withdrawal magnet 168 being again energized causes the detent 119 and the stepping pawl 112 to be withdrawn from the ratchet 113 to allow the ratchet to return to its initial position.

The control code combination shown in Fig. 1 following the ciphered code group 13 has a perforation in the second permutation which according to the Baudot code is a line feed permutation. The sensing of this perforation by the sensing contact 24 results in the energization of relays 53 and 58 over circuits identical to those previously indicated. The energization of the relay 58 results in the completion of a circuit which may be traced from positive battery 70, through the cyclically operable contact 71, through the armature 72 of the de-energized relay 73, over the lead 74, through the armature 75 of the de-energized relay 76, over the lead 77, through the armature 78 of the de-energized relay 62, over a lead 181, through an armature 182 of the de-energized relay 82, over a lead 183, through a drawn up armature 184 of the energized relay 58, over a lead 186, over the lead 164, over the lead 166, through the pivoted contact 132, now positioned within the recess 129, over the lead 167, through the withdrawal magnet 168, over the lead 169, over the lead 171 to negative battery. Again energization of the withdrawal magnet 168 results in the withdrawing of the stepping pawl 112 and the holding detent 119 to allow the ratchet to return to its initial position under the influence of the wound up helical spring 116.

In situations wherein a control code designation is not sensed following a ciphered code group, the withdrawal magnet 168 is not energized and hence the stepping pawl 112 will advance the ratchet an additional increment. This situation results from the presence of only four ciphered code combinations or six ciphered code combinations within a group. If there are less than five characters in a group, for instance four, then the fifth character will be a control character and consequently the ratchet will advance as in the case of a noncontrol character. The next character to be sensed will be an ordinary enciphered character which will fail to supply the necessary energizing circuits for actuating the withdrawal magnet 168. In other words there is an error in the composition of the ciphered code group because there is no predetermined control permutation following the fifth enciphered code combination in the tape. According to the present embodiment of the invention as disclosed in Fig. 3, it is absolutely necessary that a permutated control combination follow each five character ciphered group, otherwise the withdrawal magnet 168 is not energized. In the present instance these control code permutations have been designated a space, carriage return or line feed permutation in accordance with the Baudot code. It is to be understood, however, that additional permutations could be devised or utilized to energize the withdrawal magnet 168. In such instances all that would be necessary is that the proper control relays in the fan circuit 47 complete a circuit from positive battery 70, through the relay circuits 47, to the lead 166 and hence to the pivoted contact 132, positioned within the recess 129 of the cam 126.

Considering now the situation wherein a permutation character occurs following a ciphered code group, such as ciphered group 11 and this permutation is an A character wherein the first and second permutations in the tape are perforations, the relays 82, 88, 53 and 58 are energized resulting in the completion of a circuit from positive battery 70, through the cyclically operable contact 71, through the armature 72 of the de-energized relay 73, over the lead 74, through the armature 75 of the de-energized relay 76, over the lead 77, through the armature 78 of the de-energized relay 62, over the lead 181, through the drawn up armature 182 of the energized relay 82, over a lead 187, through a drawn up armature 188 of the energized relay 58, to a lead 189. Therefore, positive battery is applied to the lead 189 and it does not reach the withdrawal magnet 168 and as a result, the stepping pawl 112 advances the ratchet 113 an additional increment. Upon completion of this sensing operation, the ratchet is advanced an additional increment resulting in the positioning of the follower 133 wherein the recess 130 formed in the cam 127. Movement of the follower 133 results in the movement of the movable contact 134 toward the left as viewed in Fig. 3 to break the holding circuit of the start relay 141. The de-energization of the start relay 141 results in the opening of its armature 143 to break the energizing circuit of the start magnet 39 to interrupt the feeding and sensing of additional message tape by the feed wheel 21 and the sensing contacts 23 to 27, inclusive. Movement of the follower 133 also results in the completion of a circuit from positive battery 137, through the pivoted contact 134, over a lead 200, through an indicator lamp 201 to negative battery. Illumination of the indicator lamp 201 draws the operator's attention to the fact that the apparatus has ceased to operate and that there is something wrong in the ciphered code combination previously sensed. The operator will then be able to make the necessary adjustment or correction in order that the deciphering operation may continue.

Correction of the aforesaid error permits the operator to resume the operation of the deciphering operation. In order to do so, it is necessary that the stepping ratchet 112 and holding detent 119 be withdrawn from the ratchet to allow the ratchet to return to its initial position. This is accomplished by moving the start switch 136 towards the left to a reset position 202. Upon so doing a circuit is completed from positive battery 206, through the switch 136, over a lead 207, through the withdrawal magnet 168, over the lead 169, over the lead 171 to negative battery. Energization of the withdrawal magnet 168 withdraws the pawl 112 and detent 119 to allow the ratchet 116 and cams 126 and 127 to return to the initial position whereupon the follower 133 moves the pivoted contact 134 to its right-hand position. Thereafter, the start switch 136 is thrown to its right-hand position to again energize the start magnet 39 and the apparatus is then in condition for resumption of the normal sensing and deciphering operations.

Additional control circuits may be energized for controlling the operation of the printing or deciphering apparatus by energizing the figures relays 100. This may be accomplished by the sensing of a figures code combination by the sensing contacts 23 to 27, inclusive. According to the Baudot code the first, second, fourth and fifth permutations in the message tape are perforations and hence the sensing contacts 23, 24, 26 and 27 will complete circuits to energize the relays 82 and 83, 53 and 58, 62 and 66, 76 and 89, respectively, associated with these sensing contacts. A circuit may then be traced from positive battery 70, through the cyclically operable contact 71, the armature 72 of the de-energized relay 73, over the lead 74, through the drawn up armature 75 of the energized relay 76, over lead 209, through the drawn up armature 210 of the energized relay 62, over a lead 211, through a drawn up armature 212 of the energized relay 53, over a lead 213, through a drawn up armature 214 of the energized relay 88, over a lead 216, through the relays 100, over the lead 171 to negative battery. Armatures 220 to 230, inclusive, controlled by the figures relays 100 are now moved to their lower position and hence signal code combinations sensed subsequent to the sensing of a figures code combination results in additional connections being made to energize additional leads to the printing or deciphering apparatus. Energization of the center figures relay 100 draws up its armature 232 to complete a locking circuit for the figures relays 100 which may be traced from positive battery 50, over a lead 233, through the drawn up armature 232 of the energized center figures relays 100, through an armature 234 of a de-energized letters relay 236, through the figures relays 100, over the lead 171 to negative battery.

In order to de-energize the figures relays 100, the relay 236 is energized subsequent to the sensing of a letters permutation by the sensing contacts 23 to 27, inclusive. In accordance with the Baudot code the letters permutation consists of the first, second, third, fourth and fifth permutations being perforations. A circuit may be then traced from positive battery 70, through the cyclically operable contact 71, through the drawn up armature 72 of the energized relay 73, over lead 90, through the drawn up armature 91 of the energized relay 82, over the lead 92, through the drawn up armature 93 of the energized relay 53, over a lead 238, through a drawn up armature 239 of the energized relay 62, over a lead 241, through a drawn up armature 242 of the energized relay 89, over a lead 243, through the letters relay 236 to negative battery. Energization of the relay 236 results in the breaking of the holding circuit for the figures relays 100 by opening the armature 234 contained in the holding circuit.

Briefly summarizing the operation of the error detecting device, the tape 10 is fed between the sensing contacts 23 to 27, inclusive, and the fixed contact 22 to bring the first ciphered code combination into the sensing position. The start switch is then closed to energize the start magnet 39 whereupon the shaft 33 is continually rotated. The cams 41 to 45 simultaneously move the sensing contacts 23 to 27, inclusive, into position to ascertain the perforations in the tape. Subsequent to this sensing operation the eccentric cam 110 moves the pawl 112 to advance the ratchet one increment. Lastly the eccentric 32 moves the pawl 31 to advance the feed wheel 21. This cycle of operation continues for each subsequent sensing of a ciphered permutation code combination in the message tape until five such combinations are sensed. If a space, carriage return or line feed signal is sensed in the tape following these five code combinations the withdrawal magnet 168 is energized to withdraw the stepping pawl 112 and the detent 119 from engagement with the ratchet 113 to allow the ratchet to return, under the influence of the helical spring 116, to its initial position as determined by the stop 117. The sensing of a code permutation other than the aforesaid control code permutations in the tape following a ciphered code group does not result in the energization of the withdrawal magnet 168. Hence, the stepping pawl 112 advances the ratchet 113 an additional increment. This results in the positioning of the follower 133 within the recess 130 formed in the cam 127, resulting in the movement of the pivoted armature 134 from its right-hand contact position to its left-hand contact position. Two functions are performed as a result of this movement, namely, the illumination of the indicator lamp 201 and secondly, the de-energization of the holding circuit for the start relay 141 which in turn results in the de-energization of the start clutch magnet 39. Therefore, a correction by the operator must be made in order that the deciphering operation may be continued.

It is to be understood that the above described construction of apparatus and arrangement of circuits are simply illustrative of the applications of the principles of the invention and many other modifications may be made without departing from the spirit and scope of the invention.

What is claimed is:

1. In a deciphering apparatus, means for progressively sensing permutated code combinations in a control form, said code combinations arranged in groups separated by a control code combination, each of said groups consisting of a predetermined number of code combinations, means concurrently advanced with the sensing of each code combination within a group, means for urging said advancing means toward its initial position, means for maintaining the advancing means in its advanced position, and means actuated by the sensing of a control code combination for rendering said urging means effective.

2. In a deciphering apparatus, means for sensing permutated code combinations in a control form, said code combinations being arranged in groups separated by a control code combination, each of said groups consisting of a predetermined number of code combinations, means for feeding the control form past the sensing means, a controller concurrently advanced with the operation of the sensing means, means for urging the controller toward an initial position, means for retaining the controller in its advanced position, means actuated by the sensing of a control code combination after the controller has advanced a number of increments equal to the predetermined number of code combinations in a group for withdrawing the retaining means, and indicator means actuated by the controller whenever the sensing means does not sense a control code combination following the sensing of the predetermined number of code combinations in a group.

3. In a deciphering apparatus, means for sensing permutated code combinations in a control form, said code combinations being arranged in groups separated by a control code combination, each of said groups consisting of a predetermined number of code combinations, means for feeding the control form past the sensing means, a controller concurrently advanced with the operation of the sensing means, means for urging the controller toward an initial position, means for retaining the controller in its advanced position, means actuated by the sensing of a control code combination after the controller has advanced a number of increments equal to the predetermined number of code combinations in a group for withdrawing the retaining means, and means for interrupting the operation of the feeding means, said interrupting means actuated by the controller whenever the sensing means does not sense a control code combination following the sensing of the predetermined number of code combinations in a group.

4. In a deciphering apparatus, means for sensing permutated code combinations in a control form, said code combinations being arranged in groups separated by a control code combination, each of said groups consisting of a predetermined number of code combinations, means for feeding the control form past the sensing means, a controller concurrently advanced with the operation of the sensing means, means for urging the controller toward an initial position, means for retaining the controller in its advanced position, means actuated by the sensing of a control code combination after the controller has advanced a number of increments equal to the predetermined number of code combinations in a group for withdrawing the retaining means, means for interrupting the operation of the feeding means, said interrupting means actuated by the controller whenever the sensing means does not sense a control code combination following the sensing of the predetermined number of code combinations in a group, and indicator means simultaneously actuated by the controller upon operation of the interrupting means.

5. In combination, means for progressively sensing permutations in a control form, and an error detecting means for determining the propriety of a sequence of permutations in the control form wherein said permutations are arranged in groups separated by a control code combination, said error detecting means comprising a ratchet normally urged toward an initial position, means for advancing the ratchet in unison with the sensing of permutations in the control form, means for retaining the ratchet in each advanced position, cyclically operable means connected to and advanced by said ratchet, a solenoid for precluding the operation of the sensing means, and means operated by the cyclically operable means for actuating the solenoid whenever the ratchet advances past a predetermined position.

6. In combination, means for sensing permutations in a control form, a ratchet normally urged toward an initial position, means for advancing the ratchet each time permutations are sensed in the control form, means for retaining the ratchet in its advanced position, cyclically operable means advanced in unison with the advance of the ratchet, a solenoid for withdrawing the retaining means to allow the ratchet to return to its initial position, means operated upon a predetermined advance of the cyclically operable means and by the simultaneous sensing of a preselected permutation in the control form for energizing the solenoid, and indicating means actuated by the cyclically operable means whenever the preselected permutation is not sensed after the ratchet advances the predetermined distance.

7. In an error detecting device for use in deciphering apparatus, a ratchet, means for urging the ratchet toward an initial position, a stepping pawl for advancing the ratchet in unison with an advance of a permutated tape through the deciphering apparatus, a detent for engaging and holding the ratchet in each advanced position, means for sensing the permutations in the tape as it advances through the deciphering apparatus, a recessed cam advanced by said ratchet, follower means positionable within the recesses in the cam upon said cam being advanced a predetermined number of times, means actuated by the sensing of a preselected permutation in the tape when the follower means is positioned within the recess in the cam for disengaging the detent to allow the ratchet to return to its initial position, and indicating means actuated by the sensing of a permutation other than the preselected permutation when the follower means is positioned within the recess in the cam.

8. In a deciphering apparatus, means for sensing permutated code combinations in a tape, said code combinations being arranged in groups separated by a control code combination, each of said groups consisting of a predetermined number of code combinations, means for feeding the tape past the sensing means, and means for detecting errors in the number of code combinations in a group, said detecting means comprising a ratchet, means for normally urging the ratchet towards an initial position, a pawl operated in unison with the feeding means for engaging and advancing the ratchet, a detent for retaining the ratchet in its advanced position, a first recessed cam connected to and advanced by said ratchet, a second recessed cam connected to and advanced by said ratchet, a follower arm adapted to fall into the recess in the first cam when said ratchet advances a number of increments equal to the predetermined number of code combinations in a group, means actuated by the sensing of a control code combination when the arm is positioned within the recess of the first cam for withdrawing the pawl and detent from the ratchet to allow the ratchet to return to its initial position, a second follower arm adapted to fall into the recess in the second cam when the pawl advances the ratchet beyond a number of increments equal to the predetermined number of code combinations in a group, and means actuated by the second follower for interrupting the operation of the feeding means.

9. In a tape reader, means for feeding a permutatively apertured tape through the reader, means for sensing the permutations of apertures, control means advanced with each sensing of a permutation of apertures, means for urging the control means toward an initial position, means actuated by the sensing means ascertaining any one of a plurality of predetermined permutations of apertures and the control means being advanced a predetermined amount for rendering the urging means effective to return the control means to the initial position, means operated by the control means when the sensing means does not ascertain a predetermined permutation after the control means has advanced said predetermined amount for interrupting the feeding means, and means for manually rendering the urging means effective to return the control means to the initial position.

10. In a tape reader, means for feeding the tape through the reader, said tape having sets of permutations of apertures formed therein, means for successively sensing each set of apertures, a fan circuit operated by the sensing means in accordance with the sensing of each set of apertures, a controller advanced by the feeding means, means for urging the controller toward an initial position, means for holding the controller in each advanced position, and means operated by the cojoint action of a predetermined energization of the fan circuit and an advance of the controller a predetermined number of increments for removing the holding means to render the urging means effective to return the controller to the initial position.

RICHARD E. CRAGG.

References Cited in the file of this patent

UNITED STATES PATENTS

| Number | Name | Date |
|---|---|---|
| 2,406,023 | Locke | Aug. 20, 1946 |
| 2,451,045 | Potts | Oct. 12, 1948 |
| 2,481,112 | Hanley | Sept. 6, 1949 |
| 2,508,554 | Van Duuren | May 23, 1950 |
| 2,518,405 | Van Duuren | Aug. 8, 1950 |